Nov. 25, 1969  R. P. OGDEN  3,480,757
MOTOR GENERATOR TYPE WELDING APPARATUS
Filed July 18, 1967  2 Sheets-Sheet 1

INVENTOR
RALPH P. OGDEN

BY
Mann, Brown & McWilliams
ATTORNEYS

Nov. 25, 1969 R. P. OGDEN 3,480,757
MOTOR GENERATOR TYPE WELDING APPARATUS
Filed July 18, 1967
2 Sheets-Sheet 2
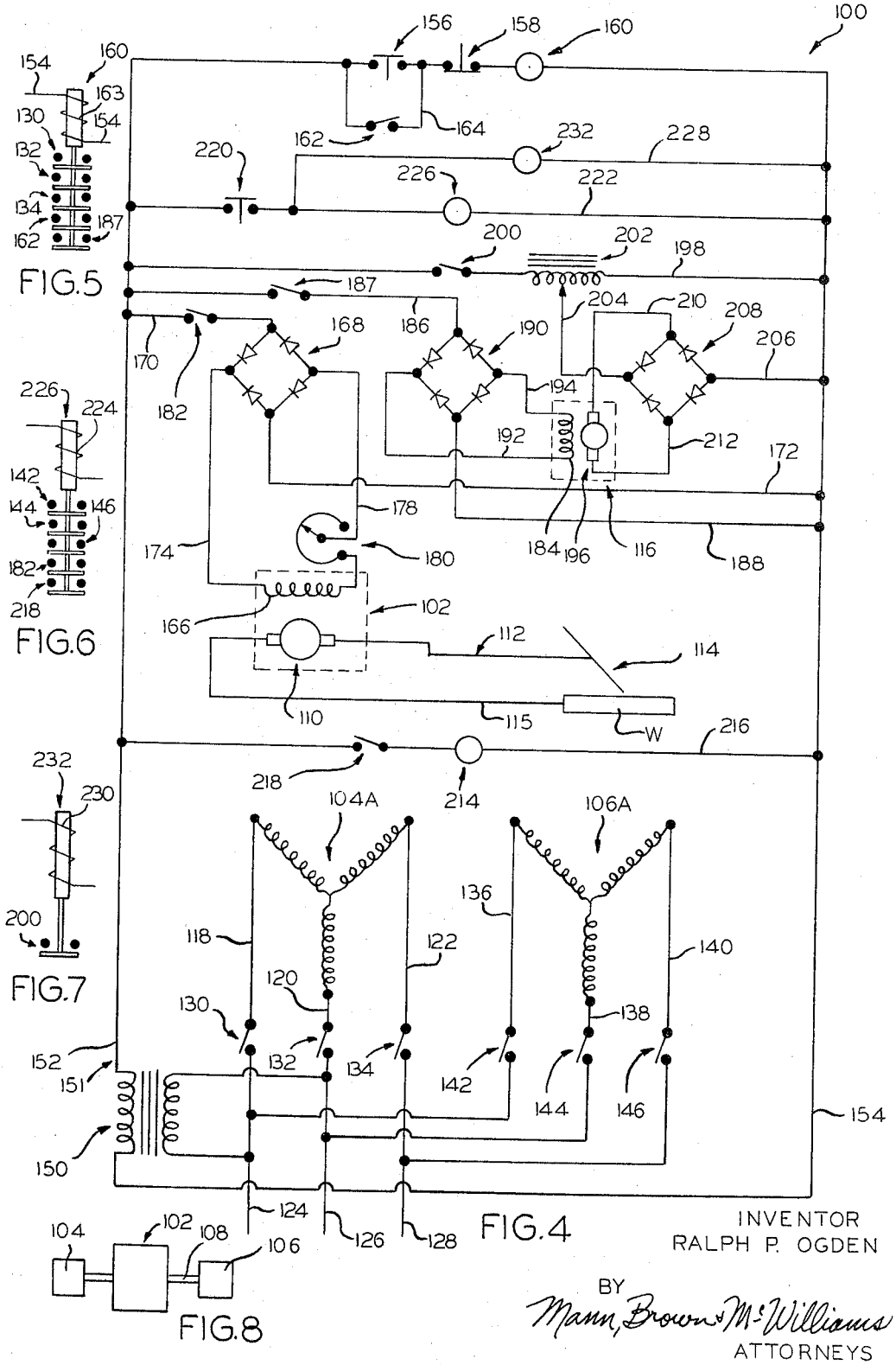
INVENTOR
RALPH P. OGDEN
BY
Mann, Brown & McWilliams
ATTORNEYS United States Patent Office 3,480,757
Patented Nov. 25, 1969

3,480,757
MOTOR GENERATOR TYPE WELDING APPARATUS
Ralph P. Ogden, Hammond, Ind., assignor to Ogden Engineering Corporation, a corporation of Indiana
Filed July 18, 1967, Ser. No. 654,192
Int. Cl. B23k 9/10
U.S. Cl. 219—134                                9 Claims

ABSTRACT OF THE DISCLOSURE

The invention pertains to motor generator type welding apparatus in which the motor generator is in the form of a welding load driving motor and an idling load driving motor arranged to operate the generator so that the welding load driving motor drives the generator at operating speed when welding is being done, and the idling motor maintains the operating speed of the generator motor during periods when no welding is being done. The result is that the motor generator operates at a power factor of at least about 60 while the apparatus remains in operation regardless of whether welding is actually being done and at a power factor on the order of 80 to 90 when no welding is being done. The application discloses apparatus for both manual stick electrode and semi-automatic welding.

---

This invention relates to a motor generator type welding apparatus, and more particularly to an arrangement for improving the power factor and electrical consumption of motor generators.

Welding power sources for welding apparatus are generally of two basic types, namely the motor generator type in which a motor operates a generator that generates the welding current, and the transformer type in which line current is run through a transformer and sometimes rectifiers to provide the welding current.

While the motor generator type is characterized by ease of control and moderate first expense, over-all operating efficiencies, especially under no-load conditions, have left much to be desired. Consequently, there has been a trend to more wide usage of the transformer type in spite of higher first cost and design complications.

With regard to welding machines of the motor generator type, heretofore it has been the practice to design the generator to provide the welding current needed to properly run a power distribution system of the scope desired and required by a particular assembly operation under consideration. The power requirement has been figured on the basis of a 100 percent use of welding time, that is, on the assumption that all of the welding equipment served by the welding machine would be in operation for the full time that the motor generator is in operation.

However, as a practical matter, experience has shown that the welding equipment involved in the particular system may be in operation no more than about 30 percent of the time, meaning that the welding generator is operating up to 70 percent of the time under no-load conditions. This means that the generator motor, which is ordinarily of the AC squirrel cage induction motor type, is operating most of the time at a very poor power factor, sometimes as low as 10. As a result, the power cost for operating welding machines of this type has usually involved at least a ten percent extra charge because of the lower power factor problem and it also means that the actual power being used includes a substantial portion of wasted power and forms what is known in the art as watt-less power.

One approach to correcting this condition has been to add capacitor banks to the motor to bring the power factor up to unity, but this has been found to be an expensive alternative and it only compensates for the problem rather than correcting it.

A principal object of this invention is to provide a motor generator type welding apparatus which permits the retention of the inexpensive squirrel cage induction motor power unit, but that operates at an efficient power factor during both welding and idling periods.

Another principal object of the invention is to provide a motor generator type welding apparatus for both stick welding and semi-automatic welding arrangements in which the motor generator includes a welding load driving motor that operates the generator efficiently at welding loads the apparatus is designed to handle, and an idling driving motor which maintains the operating speed of the generator and the welding load driving motor under no-load conditions while operating at a power factor on the order of 80 to 90.

Other objects of the invention are to provide specific stick welding and semi-automatic welding apparatus of the motor generator type that retain the squirrel cage induction motor as the basic driving unit while avoiding the watt-less power problem during welding down periods, and to provide welding apparatus of the type indicated that is economical of manufacture, convenient and safe to use, and adapted for a wide variety of applications.

Other objects, uses, and advantages will be obvious or become apparent from a consideration of the following detailed description and the application drawings.

Figures 1, 1A, 2, 3:
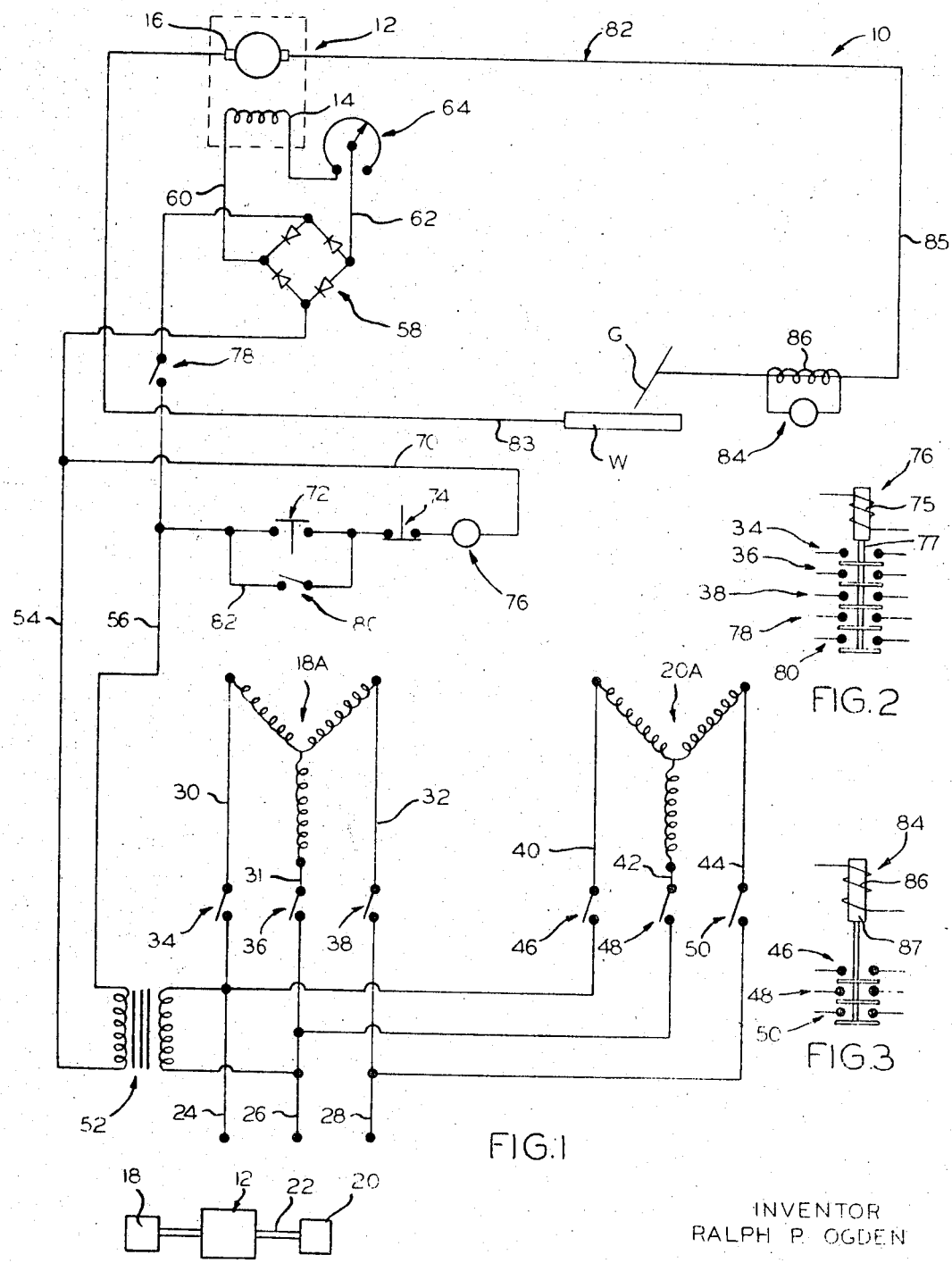
FIGURE 1 is a diagrammatic view illustrating a motor generator type stick welding apparatus embodying my invention.
FIGURE 1A illustrates the generator and its driving motors in block diagram form.

FIGURES 2 and 3 diagrammatically illustrate relays controlling switches employed in the apparatus of FIGURE 1;

FIGURE 4 diagrammatically illustrates motor generator type semi-automatic welding apparatus embodied in my invention;

FIGURES 5, 6 and 7 illustrate relay controlled switches employed in the apparatus of FIGURE 4; and FIGURE 8 illustrates in block diagram form the generator of the embodiment of FIGURE 4-7 and its driving motors.

However, it is to be distinctly understood that the specific drawing illustrations provided are supplied primarily to comply with the requirements of the Patent Code and that the invention may have other embodiments that will be obvious to those skilled in the art and that are intended to be covered by the appended claims.

Generally speaking, the motor generator welding apparatus of my invention comprises a motor generator in which the generator is provided with two AC squirrel cage induction motors coupled to the generator armature for rotating same. Ordinarily, this would involve having the motors mounted on or coupled to a shaft that is common with the generator armature shaft. One of the motors is an idling driving motor that is used to start and maintain the motor generator at operating speed and is designed to keep the flywheel effect of the rotating parts (i.e., the generator armature and the welding load driving motor rotor) in operation during periods of no welding; this motor is designed to have sufficient power to handle friction and windage requirements and to operate at rated load with a high power factor, say on the order of 80 to 90. The second motor is a welding driving motor designed to operate the generator at rated speed under partial or full welding loads, and is arranged to come into operation when welding current is to be supplied and to operate with a power factor commensurate with the usual welding load demand, that is, with a power factor in the range of 60–90 or better.

The idling motor may either be de-energized when the welding load motor operates, or the idling motor may continue to operate and supplement the driving function of the welding load motor.

Thus, as long as the welding apparatus is in operation, the motor generator will be using electricity efficiently and at a favorable power factor regardless of whether or not welding is actually being done.

Referring now more specifically to the drawings, FIGURES 1–3 diagrammatically illustrate a motor generator type of stick electrode welding apparatus 10 embodying the principles of my invention in which the generator is diagrammatically illustrated at 12 as including a field 14 and an armature 16 that is rotated by motors 18 and 20 (see FIGURE 1A) through the medium of a shaft 22 that is common to both the generator armature 16 and motors 18 and 20. FIGURE 1A incidentally is in block diagram form only and is provided primarily to visually associate the motors 18 and 20 with generator 12.

The motors 18 and 20 are both AC squirrel cage induction motors and are preferably of the unwound armature type for minimum expense of installation. These motors operate at or near a predetermined synchronous speed under both load and no-load conditions.

Motor 18 is the idling drive motor and has a stator coil indicated at 18A in FIGURE 1 while motor 20 is the welding load drive motor and has its stator coil indicated at 20A in FIGURE 1.

Motor stator coil 18A is connected to three phase power source lines 24, 26 and 28 through the respective connecting lines 30, 31 and 32 and switches 34, 36 and 38.

The motor stator 20A is connected to the respective power source lines 24, 26 and 28 through suitable connecting lines 40, 42 and 44 that are respectively interrupted by switches 46, 48 and 50.

The field 14 of generator 12 is excited by employing a transformer indicated at 52 operably associated in the usual manner with power lines 24 and 26 for supplying AC current to lines 54 and 56 which feed to rectifier 58 that converts the current to DC and supplies it to the field 14 through lines 60 and 62 and a variable resistance 64 that controls the generator field excitation for in turn controlling the voltage output of the welding generator.

Connected across lines 54 and 56 is a line 70 that includes normally open push button switch 72, that is employed to start up the motor generator apparatus by starting idling motor 18, and a normally closed push button 74 to stop the welding apparatus by shutting off motor 18. Also incorporated in the line 70 is the coil 75 (see FIGURE 2) of solenoid switch or relay 76 that simultaneously controls through plunger 77 switches 34, 36 and 38 as well as the switch 78 that interrupts line 56 and the switch 80 that is in line 82 that shunts switch 72, in the manner suggested by FIGURE 2.

The generator armature 16 is incorporated in welding current circuit 82 which includes the workpiece W and its ground 83, a suitable welding head, such as the welding gun G which as illustrated is intended to represent a conventional stick electrode end type holder, and line 85 extending between armature 16 and gun G. Operably associated with the circuit 82 is a relay or solenoid switch 84 having its coil 86 operably associated with circuit 82 in the manner suggested in FIGURE 1 so that when current flows through circuit 82, relay 84 operates through its plunger 87 to close switches 46, 48 and 50 in the manner suggested in FIGURE 3.

It will be appreciated that the diagrammatic showings of FIGURES 2 and 3 are merely representative of how conventional relays may be designed to simultaneously open and close the banks of switches indicated.

To put the apparatus 10 in operation, the operator closes push button switch 72 that operates relay 76 to close switches 34, 36, 38, 78 and 80. Assuming lines 24, 26 and 28 are connected to a source of three phase electrical power, the generator field 14 is excited through lines 54 and 56, rectifier 58, lines 60 and 62 and variable resistor 64 and simultaneously motor 18 is started and rotates generator armature 16 at rated speed, which is the synchronous speed of motors 18 and 20. Assuming gun G is initially separated from workpiece W, the generator 12 establishes a potential in the welding circuit 82 but no current flows. Relay 84 will thus remain in its thus retracted or open switch position, which is shown in FIGURE 3, and motor 20 does not operate.

To start the welding operation, the welder scratches the work W with the stick electrode of gun G, establishing an arc between the gun and the work in the usual manner. The current flow through coil 86 of relay 84 causes relay 84 to close switches 46, 48 and 50 that brings current into stator 20A of motor 20 which operates to rotate the generator armature 16 under the welding current load as long as welding continues.

When welding is to be discontinued, the welder moves the gun G sufficiently far away from the work W to break the arc, which stops the current flow through welding circuit 82. Relay 84 then is de-energized and switches 46, 48 and 50 open to stop operation of motor 20. Motor 18 continues to rotate the generator armature at rated speed.

Reference numeral 100 of FIGURE 4 indicates a diagrammatically illustrated motor generator type semi-automatic welding apparatus for MIG welding embodying the principles of this invention.

Apparatus 100 generally comprises a generator generally indicated at 102 that is driven by motors 104 and 106, see FIGURE 8, that are comparable to motors 18 and 20, respectively, The motors 104 and 106 are thus coupled to a shaft 108 that is common to them and to the armature 110 (of the generator 102) that is incorporated in welding current circuit 112 which includes the diagrammatically illustrated semi-automatic welding head or gun 114 through which welding wire is fed by a welding wire feed drive including drive motor 116. The workpiece is indicated by the letter W and its ground is indicated at 115.

Motors 104 and 106 are also of the AC squirrel cage induction motor type having unwound rotors. Motor 104 includes a stator coil 104A that is connected by lines 118, 120 and 122 to power lines 124, 126 and 128, respectively, through the respective switches 130, 132 and 134.

Motor 106 includes stator coils 106A connected by lines 136, 138 and 140 to lines 124, 126 and 128, respectively, through the respective switches 142, 144 and 146.

In the arrangement of FIGURES 4–8 the motor 104 is the idling drive motor and its operation is controlled through a control circuit 151 supplied with current by transformer 150 that is operably associated in the usual manner with power lines 124 and 126 and is connected to leads 152 and 154 that are in series connection with normally open push button switch 156, normally closed push button switch 158, and solenoid switch or relay 160 that controls switches 130, 132, and 134 as well as a switch 162 that is interposed in line 164 that shunts the switch 156. FIGURE 5 diagrammatically illustrates the solenoid switch type relation that relay 160 may have with switches 130, 132, 134 and 162, in which coil 163 of relay 160 is connected in line 154.

Push button switch 156 is employed to start up motor 104 to turn on the apparatus 100 for idling purposes and switch 158 shuts off the apparatus 100.

The field 166 of generator 102 is excited with DC current by AC current from transformer 150 via supply lines 152 and 154 feeding to the field 166 through leads 170 and 172, rectifier 168, and leads 174 and 178. Included in the lead 178 is a variable resistor 180 for the purpose of controlling the exitation of field 166 to in turn control the voltage output of the generator. Switch 182 is interposed in line 170 that leads to rectifier 168.

The motor 116 of the welding wire feed assembly includes a field 184 that is excited by AC current supplied through transformer 150, leads 152 and 154, and leads 186 and 188 that lead to rectifier 190 that supplies DC current to the field 184 through leads 192 and 194. An off-on switch 187, also controlled by relay 160, is interposed in line 186 that leads to rectifier 190. The armature 196 of the motor 116 is wound and is energized by current supplied through transformer 150, leads 152 and 154 and a lead 198 that is connected across lines 152 and 154 and that includes in series connection switch 200 and variable auto-transformer 202 that controls the speed of the wire feed motor 116. The armature 196 of motor 116 is connected between lines 152 and 154 through the variable auto-transformer 202 by lines 204 and 206 that are connected to rectifier 208 that supplies armature 196 with direct current through leads 210 and 212.

The apparatus 100 includes conventional devices for supplying shielding gas to the gun 114, the flow of which is controlled by an electrically operated valve diagrammatically indicated at 214 that is interposed in line 216 connected between lines 152 and 154, the operation of which is controlled by a switch 218 in line 216.

The gun 114 carries a normally open trigger switch 220 that is interposed in line 222 which is connected between the leads 152 and 154 and also includes the coil 224 of time delay (in de-energization) solenoid switch or relay 226 that controls switches 142, 144 and 146, 182 and 218 in the manner diagrammatically illustrated in FIGURE 6. Connected across the switch 226 between switch 220 and line 154 is line 228 which includes the coil 230 of solenoid operated switch or relay 232 which controls switch 200 of the welding wire feed motor 116. Switch 232 is diagrammatically illustrated in FIGURE 7.

Assuming that lines 124, 126 and 128 are supplied with three phase AC power, the apparatus 100 is started by closing switch 156, which operates relay 160 to close switches 130, 132, and 134, thereby starting up motor 104 and operating generator 102 under idling conditions. Also, closed by relay 160 is switch 162, which permits switch 156 to be released, and switch 187, which effects supply of the field 184 of welding wire feed motor 116 with direct current by rectifier 190 via lines 152, 154, 186 and 188.

To begin a welding operation, when the welder has appropriately positioned his gun 114, he engages trigger switch 220 and holds it closed. This energizes relay 226, which simultaneously closes switches 142, 144, 146, 182 and 218, and also energizes relay 232, which simultaneously closes switch 200. Thus, motor 106 is started up to drive generator 102 to supply welding current to welding current circuit 112 and the armature 196 of welding wire feed motor 116 is energized to start the feed of the welding wire through the gun 114; also, gas valve 214 simultaneously opens to supply shielding gas to the welding zone. It will be noted that all of these events occur simultaneously.

The movement of the welding wire brings the wire tip into engagement with the work so that the welding operator can create the arc in the usual manner and start the welding operation.

After the welder has completed a particular welding operation and wishes to stop welding, he releases the trigger switch 220, which effects opening of relay 232 immediately that stops the welding wire feed motor 116 by interrupting line 198 at switch 200. Relay 226 is designed in a conventional manner to delay opening the switches it controls until after the motor 116 stops, whereupon switches 142, 144, 146, 182 and 218 are simultaneously opened, stopping the welding load driving motor 106, de-energizing the generator field 166 and effecting the closing of gas valve 214. Generator armature 110 continues to rotate at the rated speed of the generator under the idling driving action of idler drive motor 104.

It will therefore be seen that this invention provides a motor generator type welding appartus arrangement that permits operation of the generator under both welding load and no-load conditions at the desired power factor levels while at the same time employing the inexpensive squirrel cage type induction motor in its simplest and most inexpensive form. Watt-less power consumption due to the use of welding machines of the motor generator type is thus substantially eliminated and the power distribution system for any one installation will accommodate as much as twice as many more pieces of welding apparatus without being overloaded than was considered practical in prior arrangements because of the poor power factor problem during non-welding periods.

It is to be understood that the stick welding and semi-automatic welding apparatus disclosed are diagrammatically illustrated only as those skilled in the art having the principles of this invention before them will be able to understand what is required to assemble specific operating apparatus in accordance with this invention. In particular, the specifics of the circuiting wiring and the welding current generator driving motors are largely optional, although the AC squirrel cage type induction motor with unwound rotors is preferred.

For instance, the two driving motors may be arranged in the same housing using a common rotor and having their stator windings wound on a common stator (as for instance, in common stator slots), or they may be physically separate motors connected to the generator armature by a common shaft. Furthermore, the operation of the idling motor may be shut off when the welding load driving motor operates by appropriately arranging the switching therefor.

While only one welding gun is shown in the two embodiments, it is to be understood that the single gun illustrated is intended to represent one or more guns that conventionally are employed in motor generator welding system, although where more than one gun is employed, the circuitry employed will have to be arranged in a conventional manner so that the welding load drive motor continues to drive so long as at least one gun is operating, and so that apparatus needed to supply the individual guns (as for instance the gas supply in the case of semi-automatic equipment) is made operational when a particular gun is to be operated. This may be done in any suitable manner.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A motor generator type welding machine comprising:
   a generator including a rotatable armature,
   a driving motor for rotating said armature under welding load conditions at a predetermined speed,
   an idling motor for rotating said armature under no load conditions at said speed,
   means for coupling said motors to said armature,
   means for electrically connecting said generator armature to a welding gun including means for deenergizing said gun,
   and means for electrically energizing said motors including means for de-energizing said driving motor when said gun is de-energized by operation of said gun de-energizing means.

2. A motor generator type welding machine comprising:
   a generator including a rotatable armature,
   a welding load driving motor for rotating said armature under welding load conditions at a predetermined speed, an idling load driving motor for rotating said armature under no welding load conditions at said speed, means for coupling said motors to said armature for rotating same, means for electrically connecting said generator armature and a welding head in a welding current supplying circuit, and means for connecting said motors to a source of electrical energy for actuating same to operate at said speed including switch means for disconnecting said welding load driving motor from said source, and means for actuating said switch means to electrically disconnect said welding load driving motor from said source when welding current ceases in said supplying circuit and to electrically connect said welding load driving motor to said source when welding current flows in said supplying circuit.

3. A motor generator type welding machine comprising:
a generator including a rotatable armature, a welding load driving motor for rotating said armature under welding load conditions at a predetermined speed at a power factor of about 60 or more, an idling load driving motor for rotating said armature under no welding load conditions at said speed at a power factor of about 80 or more.

means for coupling said motors to said armature for rotating same, means for electrically connecting said generator armature and a welding head in a welding current supplying circuit, means for connecting said motors to a source of electrical energy for actuating same to operate at said speed including switch means for disconnecting said welding load driving motor from said source, and means for actuating said switch means to electrically disconnect said welding load driving motor from said source when welding current ceases in said supplying circuit and to electrically connect said welding load driving motor to said source when welding current flows in said supplying circuit, whereby said welding load driving motor operates only with a power factor of about 60 or more percent during operation of said machine.

4. A welding apparatus of the motor generator type, said apparatus comprising:

welding torch means including a one or more welding heads, a generator including a rotatable armature, means for electrically connecting said generator armature and said welding torch means in a welding current supplying circuit, a welding load driving motor for rotating said armature under welding load conditions of said torch means at a predetermined speed at a power factor of about 60 or more, an idling load driving motor for rotating said armature under no welding load conditions of said torch means at said speed at a power factor of about 80 or more, means for coupling said motors to said armature for rotating same, means for connecting said motors to a source of electrical energy for actuating same to operate at said speed including switch means for disconnecting said welding load driving motor from said source, and means for actuating said switch means to electrically disconnect said welding load driving motor from said source when welding current ceases in said supplying circuit and to electrically connect said welding load driving motor to said source when welding current is supplied to said supplying circuit, whereby said welding load driving motor operates only with a power motor of about 60 or more percent during operation of said machine.

5. The apparatus set forth in claim 4 wherein
said motors comprise squirrel cage induction motors having unwound rotor means.

6. The apparatus set forth in claim 5 wherein said motors comprise:
a common housing formed to define stator winding slot means,
with the stators of said motors being wound in said slot means,
and said rotor means comprises a single rotor common to both said motors.

7. The apparatus set forth in claim 4 wherein:
said welding torch means welding head comprises a manually operated stick electrode type welding gun,
and wherein said welding current supplying circuit includes current operated relay means controlling said switch means.

8. The apparatus set forth in claim 4 wherein
said welding torch means welding head is a semi-automatic type welding gun, and including:
welding wire feed means for feeding welding wire to said gun including motor means for driving same,
a trigger switch carried by the gun and incorporated in an electrical control circuit connected to said source of electrical energy,
said motor means of said welding wire feed means being incorporated in an electrical circuit connected to said source of electrical energy including circuit opening means for disconnecting said welding wire feed means from said source,
said electrical control circuit including relay means controlling said circuit opening means and time delay relay means controlling said switch means,
said relay means being connected in parallel between said trigger switch and said source,
said time delay relay means opening said switch means at a predetermined time delay after said trigger switch is opened,
whereby said welding wire feed means ceases wire feed prior to the time said welding load driving motor is disconnected from said source.

9. A motor generator type welding machine comprising:
a generator including a rotatable armature,
a welding load driving motor for rotating said armature under welding load conditions at a predetermined speed,
an idling load driving motor for rotating said armature under no load conditions as said speed,
means for coupling said motors to said armature for rotating same,
means for electrically connecting said generator armature and a welding head in a welding current supplying circuit including means for opening and closing said circuit,
and means for connecting said motors to a source of electrical energy including switch means for disconnecting said welding load driving motor from said source when said welding current supplying circuit is opened by said opening and closing means.

References Cited

UNITED STATES PATENTS 2,102,481  12/1937  Noel.

JOSEPH V. TRUHE, Primary Examiner

J. G. SMITH, Assistant Examiner

U.S. Cl. X.R.

322—39